(12) United States Patent
Gerst et al.

(10) Patent No.: US 11,806,822 B2
(45) Date of Patent: Nov. 7, 2023

(54) SPINDLE ARRANGEMENT FOR A MACHINE TOOL COMPRISING AN OPTICAL ELEMENT AND OPTICAL ELEMENT MORE PARTICULARLY FOR A SPINDLE ARRANGEMENT OF THIS TYPE

(71) Applicant: Franz Kessler GmbH, Bad Buchau (DE)

(72) Inventors: Manuel Gerst, Biberach an der Riss (DE); Joachim Van Sprang, Ravensburg (DE); Stefan Reiner, Ertingen (DE)

(73) Assignee: Franz Kessler GMBH, Bad Buchau (DE)

( * ) Notice: Subject to any disclaimer, the term of this patent is extended or adjusted under 35 U.S.C. 154(b) by 937 days.

(21) Appl. No.: 16/321,425

(22) PCT Filed: Jul. 10, 2017

(86) PCT No.: PCT/EP2017/067233
§ 371 (c)(1),
(2) Date: Jan. 28, 2019

(87) PCT Pub. No.: WO2018/019551
PCT Pub. Date: Feb. 1, 2018

(65) Prior Publication Data
US 2020/0406411 A1    Dec. 31, 2020

(30) Foreign Application Priority Data
Jul. 28, 2016 (DE) ..................... 10 2016 009 237.8

(51) Int. Cl.
B23Q 17/24 (2006.01)
B23B 25/06 (2006.01)
(Continued)

(52) U.S. Cl.
CPC ......... *B23Q 17/00* (2013.01); *B23Q 17/2404* (2013.01); *B23B 49/00* (2013.01)

(58) Field of Classification Search
CPC .... B23Q 17/00; B23Q 17/2404; B23Q 17/24; B23Q 17/22; B23Q 1/70; B23Q 16/005;
(Continued)

(56) References Cited

U.S. PATENT DOCUMENTS 4,750,835 A * 6/1988 McMurtry ............. G01B 11/24
356/624
5,121,188 A * 6/1992 Patridge ............... G02B 6/4204
257/680

(Continued)

FOREIGN PATENT DOCUMENTS

CN    201093412 Y    7/2008
DE    20013242 U1   1/2001
(Continued)

OTHER PUBLICATIONS

International Search Report issued for corresponding International Patent Application No. PCT/EP2017/067233 dated Nov. 6, 2017 (English language translation attached).

(Continued)

*Primary Examiner* — Nicole N Ramos
(74) *Attorney, Agent, or Firm* — Moore & Van Allen, PLLC; Henry B. Ward, III

(57) ABSTRACT

A spindle arrangement for a machine tool comprising a spindle housing, which can be inserted and fixed in the machine tool, a spindle shaft being accommodated in the spindle housing, and a spindle head projecting from the spindle housing. At least one optical element is located on or near the spindle head, the optical element emits light in the region of the spindle head and/or to optically capture the region near the spindle head. At least one recess is provided (Continued)

on or near the spindle head, the optical element being insertable into the recess. The optical element is provided with at least two contacts arranged on the front face on different radial levels or in different axial regions relative to the screw axis on the end of the optical element which is screwed into the recess.

17 Claims, 4 Drawing Sheets

(51) Int. Cl.
  *B23Q 17/00* (2006.01)
  *B23B 49/00* (2006.01)
(58) Field of Classification Search
  CPC ....... B23Q 15/00; B23B 49/00; B23B 49/001; B23B 25/06; B23B 25/065
  See application file for complete search history.

(56) References Cited

U.S. PATENT DOCUMENTS

| | | | | |
|---|---|---|---|---|
| 5,248,229 | A * | 9/1993 | Bilz | B23Q 11/04 408/6 |
| 5,394,430 | A * | 2/1995 | Huang | H01S 5/02253 372/107 |
| 5,878,073 | A * | 3/1999 | Wu | H01S 5/02212 359/829 |
| 6,158,929 | A * | 12/2000 | Fisher | B25B 23/0064 408/202 |
| 7,200,516 | B1 * | 4/2007 | Cowley | B23B 49/00 356/138 |
| 7,564,080 | B2 * | 7/2009 | Ferstl | H01S 5/024 257/288 |
| 10,183,371 | B2 * | 1/2019 | Corletto | G01B 5/012 |
| 10,399,198 | B2 * | 9/2019 | Wixey | B23Q 17/2423 |
| 2004/0136796 | A1 * | 7/2004 | Chen | B23Q 17/24 408/16 |
| 2006/0104731 | A1 * | 5/2006 | Etter | B23Q 17/24 408/16 |
| 2006/0112581 | A1 * | 6/2006 | Nortmann | B23Q 17/2423 408/16 |
| 2007/0030486 | A1 * | 2/2007 | Gelbart | B23Q 17/2233 356/399 |
| 2007/0068020 | A1 * | 3/2007 | Adrian | B23Q 17/2404 33/286 |
| 2008/0110036 | A1 * | 5/2008 | Chen | B23Q 17/2404 33/286 |
| 2010/0053957 | A1 * | 3/2010 | Pawelko | F21S 8/033 362/249.02 |
| 2010/0242695 | A1 * | 9/2010 | Xu | B23Q 17/24 83/13 |
| 2012/0170246 | A1 | 7/2012 | Huang | |
| 2013/0127345 | A1 * | 5/2013 | Hasler | H05B 47/10 315/127 |
| 2013/0240088 | A1 * | 9/2013 | Schnell | B25F 5/021 144/154.5 |
| 2014/0177019 | A1 * | 6/2014 | Yoneima | H04N 1/04 359/197.1 |
| 2015/0165580 | A1 * | 6/2015 | Holland | B23Q 17/2275 408/1 BD |
| 2016/0016274 | A1 * | 1/2016 | Grau | B23Q 17/249 356/612 |
| 2016/0059321 | A1 * | 3/2016 | Kovach | B25H 1/0071 408/16 |
| 2017/0318645 | A1 * | 11/2017 | Hasler | H05B 47/24 |

FOREIGN PATENT DOCUMENTS

| | | |
|---|---|---|
| DE | 102008046621 A1 | 3/2010 |
| DE | 102010025900 A1 | 1/2012 |
| DE | 102012023328 B3 | 5/2014 |
| DE | 102014113051 A1 | 3/2015 |
| EP | 0800703 A2 | 10/1997 |
| JP | 2005028461 A | 2/2005 |

OTHER PUBLICATIONS

Written Opinion issued for corresponding International Patent Application No. PCT/EP2017/067233 dated Nov. 6, 2017 (English language translation not attached).
German Search Report issued for corresponding German Patent Application No. 10 2016 009 237.8 dated May 15, 2017 (English language translation not attached).
International Preliminary Examination Report issued for corresponding International Patent Application No. PCT/EP2017/067233 dated Jul. 3, 2018 (English language translation not attached).
Office Action issued by the Chinese Patent Office for Chinese Patent Application No. 201780045803.0, dated Nov. 1, 2021.

* cited by examiner

SPINDLE ARRANGEMENT FOR A MACHINE TOOL COMPRISING AN OPTICAL ELEMENT AND OPTICAL ELEMENT MORE PARTICULARLY FOR A SPINDLE ARRANGEMENT OF THIS TYPE

FIELD

The present invention relates to a spindle arrangement for a machine tool, comprising a spindle housing in which a spindle shaft is accommodated and which is insertable and fixable in the machine tool, and a spindle head which protrudes from the spindle housing and which has a coupling device for coupling a tool to the spindle shaft.

BACKGROUND

Spindle arrangements of this type are known from the prior art and used in various machine tools, for example in lathes or milling machines. It has been shown that, in particular in complex machine tool systems, spindle arrangements having a modular design are used which for maintenance purposes or replacement may be separately removed from the machine tool. In other words, these types of spindle arrangements are designed as separate modules that may be provided in different configurations.

Within the scope of current manufacturing processes, it is common to illuminate the machining site on a workpiece, using additional lighting means, and to optically monitor same, optionally using optical monitoring means such as cameras or the like. These optical components are generally separately mounted as independent systems in the machine tool.

This results in an additional equipment outlay.

The document DE 10 2014 113 051 A1 describes a spindle arrangement having an image processing system and a light source on the spindle head.

The document DE 10 2012 023 328 B3 likewise describes a spindle arrangement in which a camera having a strobe light is displaceably mounted on the spindle head.

In addition, the document DE 10 2008 046 621 A1 discloses a spindle arrangement in which a camera is situated near the spindle.

The prior art according to DE 10 2010 025 900 A1 describes a work spindle in which distance sensors are provided on the front face.

Lastly, the document JP 2005-028461 A describes a spindle arrangement having a circumferential illumination screen on the spindle head.

BRIEF SUMMARY OF THE INVENTION

The object of the invention is to design spindle arrangements of this type that have additional functions, and that are even more convenient during installation and maintenance and also during operation.

According to the invention, this object is achieved by providing a spindle arrangement of the type described at the outset, wherein at least one optical element is situated at or near the spindle head, and is designed to emit light in the region of the spindle head and/or to optically detect the region near the spindle head, wherein in addition at least one recess, into which the optical element is insertable, is provided at or near the spindle head, wherein in addition the optical element is screwable into the recess on the spindle head or otherwise insertable and fixable therein, and wherein the optical element, on its end that is screwable into the recess, is provided with at least two contacts that are situated on the front face at different radial levels or in different axial regions with respect to the screw-in axis.

Unlike in the prior art, the present invention provides that at least one optical element, used for illuminating and/or for optically monitoring the work area, is integrally mounted on the spindle arrangement itself. The advantage of the present invention is that at least one optical element is to be situated near the machining area without having to provide additional, interfering components within the machine tool. The integral mounting of the at least one optical element substantially reduces the equipment outlay and simplifies the machine tool significantly.

As the result of providing a recess on the spindle head, it is possible to protect the optical element and to situate it close to the machining area.

In addition, it may be provided according to the invention that the recess is provided with a thread, and the optical element is screwable or otherwise insertable into the recess on the spindle head. This ensures particularly simple, maintenance-friendly, and reliable mounting of the optical element on the spindle head. As an alternative to screwing in, insertion and fixing via a twist-lock mechanism such as a bayonet lock, gluing in, snapping in, form-fit insertion with additional axial fixing, or the like may be carried out.

In this regard, according to the present invention it is possible for the optical element to be provided with a sealing arrangement that cooperates with the spindle head in a sealing manner. Thus, the optical element may be provided with an O-ring, for example, that is situated on a shoulder adjoining a threaded shaft of the optical element. In addition, the sealing arrangement may be integrally formed on the optical element.

With regard to simple installation and reliable functioning [according to] the invention, particular emphasis should be placed on the electrical contacting of the active optical element. As indicated above, it is preferably provided that the optical element is simply screwed into a recess in the spindle head. In this regard, it is provided according to the invention that the optical element, on its end that is screwable into the recess, is provided on the front face with at least two contacts situated at different radial levels with respect to the screw-in axis. Alternatively, it may be provided that the optical element on its circumferential surface has at least two contacts that are spatially separate from one another.

Furthermore, in this embodiment of the invention it is provided that a counter contact arrangement is fixed in the recess, on which counter contacts are situated on the front face at correspondingly different radial levels or in different axial regions with respect to the screw-in axis. The counter contact arrangement may be designed in the form of a board that has circular concentric counter contact surfaces, and that is firmly fixed in a receiving recess in the spindle head, for example by adhesive bonding. The board is appropriately coupled to the spindle electronics system, depending on the function of the optical element. In such a design, the optical element is screwed into the recess, wherein the particular contacts that are situated on the rear side of the optical element in various radial regions always engage with the correct counter contact on the board, regardless of their angular position that is determined by the screwing-in. When the contacts are mounted on the circumferential surface of the optical element, the counter contact surfaces are provided in a cylindrical area of the receiving recess.

The invention preferably provides that the contacts and/or the counter contacts are elastically pretensioned. The elastic pretensioning of the contacts and/or counter contacts ensures reliable electrical contact within a predetermined range of the screw-in depth.

According to one embodiment variant of the invention, it may be provided that the optical element includes a light-emitting component, in particular an LED lighting means, a laser diode, or the like. These types of optical elements may be used for illuminating the machining area. In addition, by using a focused laser beam, for example, additional functions may be realized with such optical elements, for example to implement alignment aids or measuring processes, in particular a triangulation process.

In addition, according to the invention it may be provided that the optical element includes an optical sensor, in particular a photoelectric barrier, a CCD sensor, a camera, or the like. In addition or as an alternative to at least one optical element for illuminating the work area, according to this embodiment variant of the invention at least one optical element may also be provided that is used to optically detect the work area on the spindle head. Thus, for example, the instantaneous machining state may be detected or monitored via a suitable camera.

One refinement of the invention provides that the optical element includes a focusing lens or a dispersing lens.

Furthermore, according to the invention it may be provided that the optical element is manufactured with a housing made of resistant material, in particular metal such as stainless steel, or plastic. As indicated above, a sealing arrangement may be integrated into a plastic housing, for example.

For ease of handling, in one refinement according to the present invention the optical component provides that the housing is designed with a profiled outer circumference, in particular a polygonally profiled outer circumference. As a result, the optical component may be more easily screwed into and unscrewed from the spindle housing.

According to one preferred embodiment variant of the invention, at least one optical element, preferably a plurality of optical elements, is provided on the spindle head at an end face and/or at a circumferential surface, wherein the at least one optical element in a predetermined orientation emits light into the area where a tool is coupled, the light emission preferably being directed in the shape of a cone or a beam. Depending on the requirements, the light emission of the optical element may be influenced with regard to the shape and focusing via suitable optical means such as lenses, diaphragms, filters, or the like.

The invention further relates to an optical element, in particular for a spindle arrangement of the above-described type, having the features of the optical element as stated above.

BRIEF DESCRIPTION OF THE SEVERAL VIEWS OF THE DRAWINGS

One exemplary embodiment of the present invention is explained below with reference to the appended figures, which show the following.

DETAILED DESCRIPTION OF EMBODIMENTS OF THE INVENTION

Figure 1:
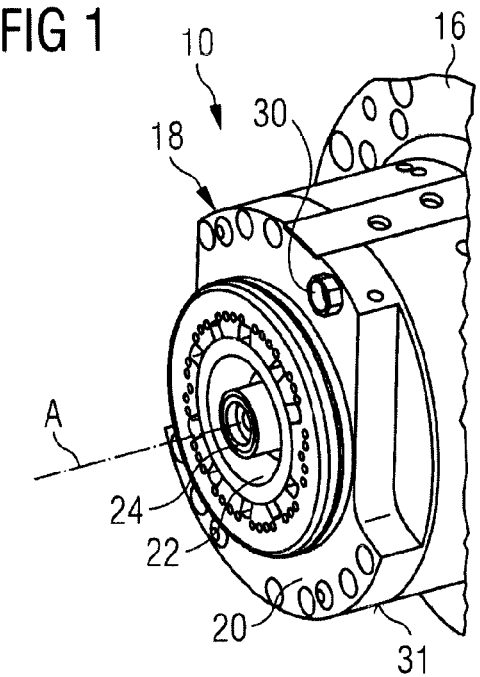
FIG. 1 shows a perspective partial view of a spindle of a spindle arrangement according to the present invention.
Figure 2:
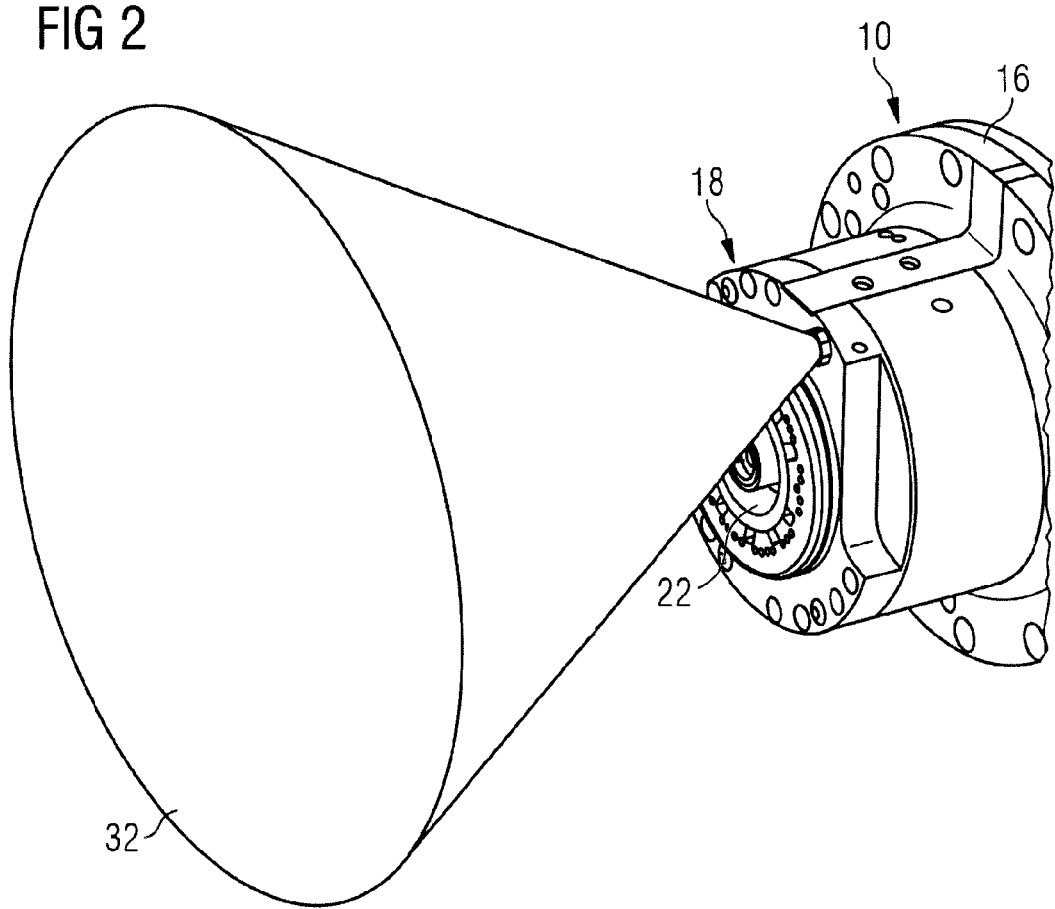
FIG. 2 shows an illustration corresponding to FIG. 1, with an indicated beam cone of a spindle arrangement according to the invention with an LED.
Figure 3:
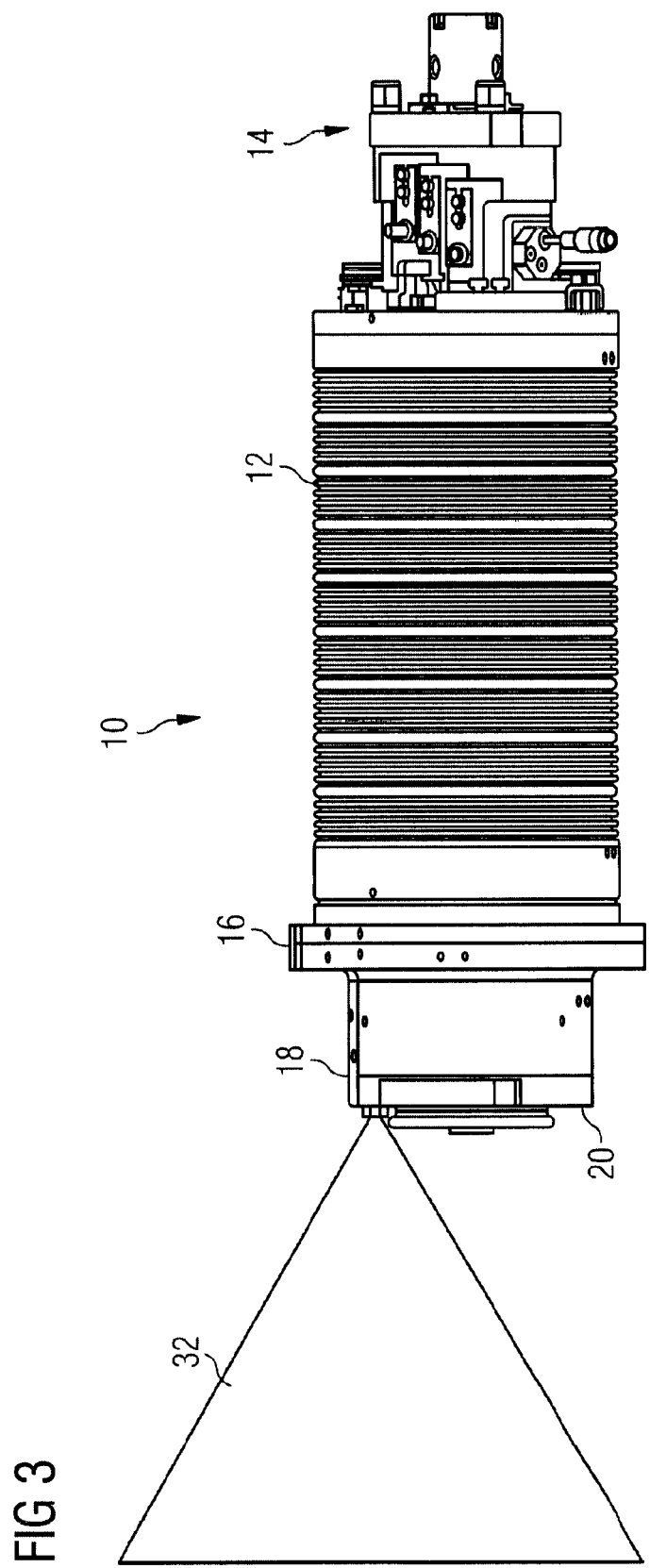
FIG. 3 shows a side view of the spindle arrangement according to the invention with the indicated beam cone.
Figure 4:
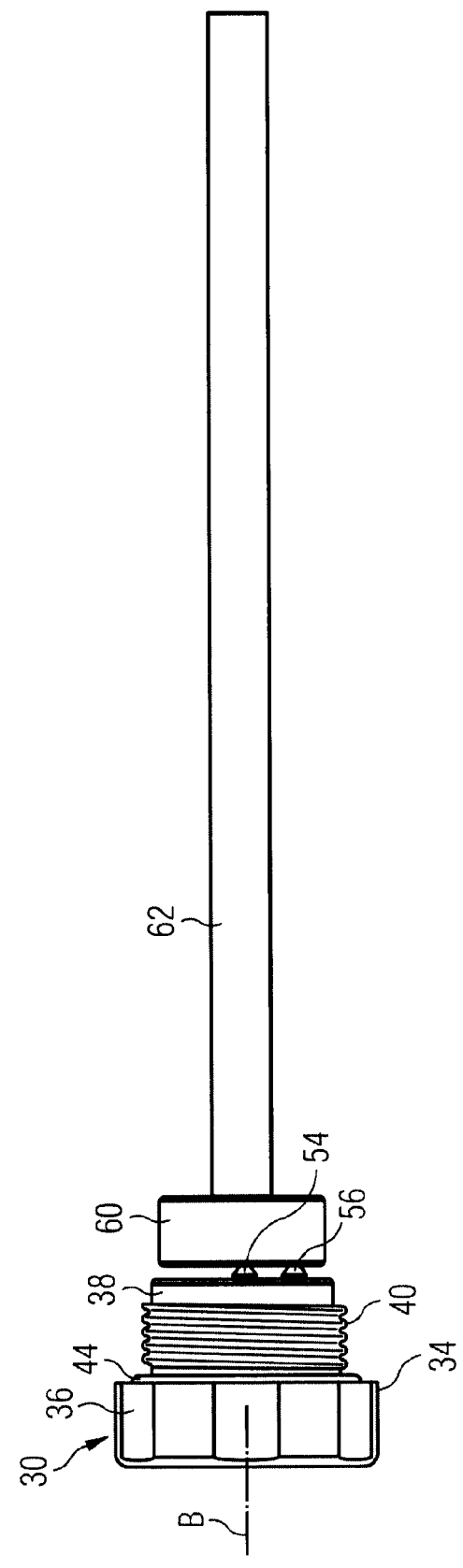
FIG. 4 shows a side view of an optical element according to the invention, designed as an LED, with a contact board that is mountable in the spindle arrangement according to the invention.
Figure 6:
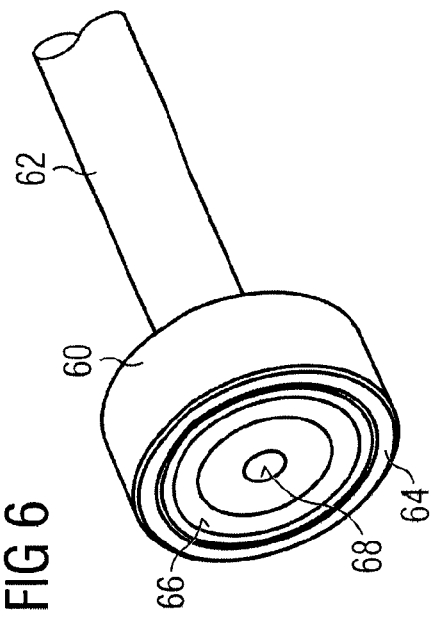
FIG. 6 shows the contact board according to FIG. 4 with a supply line, in a perspective front view.
Figure 5:
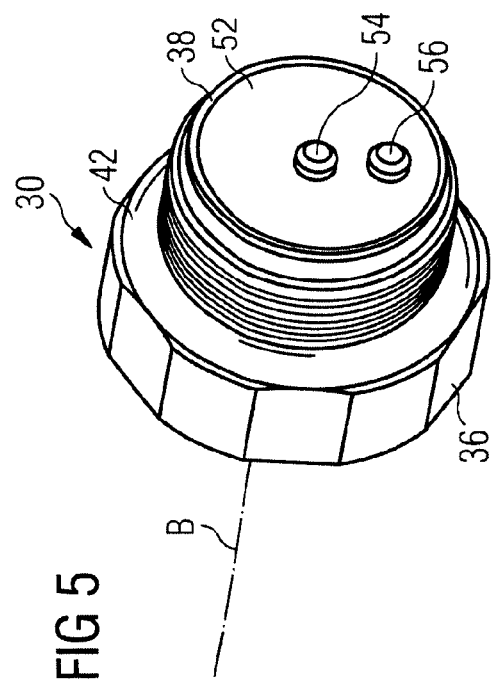
FIG. 5 shows the optical element of the present invention according to FIG. 4 in a perspective rear view.
Figure 7:
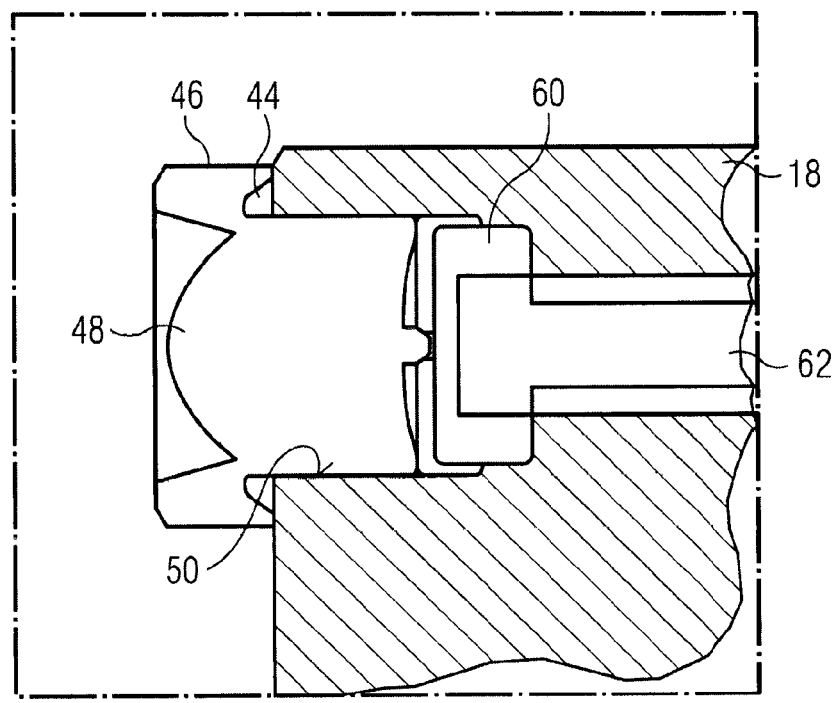
FIG. 7 shows a schematic partial sectional view of the optical element according to the invention, screwed into the spindle head.

FIGS. 1 through 3 show a spindle arrangement according to the invention in various views, denoted in general by reference numeral 10. The spindle arrangement includes a spindle housing 12, which may be mounted in a corresponding recess in a machine tool, not shown. The spindle housing 12 on its right end in FIG. 3 has a plurality of hydraulic, pneumatic, and/or electrical connections 14 via which the spindle arrangement is controllable in a known manner.

The spindle arrangement 10 is designed as an independent module. A motorized drive is provided in the spindle housing 12 in a manner known per se. The spindle housing 12 has a housing flange 16 via which the spindle arrangement 10 is fixable to the machine tool. The housing flange 16 is adjoined by a spindle head 18 having an end-face side 20. A recess 22 from which a coupling section 24 extends is provided in the end-face side 20. The coupling section 24 is fixedly coupled to the rotationally driven spindle shaft of the spindle arrangement 10, and is used to couple a tool (not shown), such as a milling tool, or a tool receptacle to the spindle shaft, this tool being subsequently rotationally drivable via the spindle shaft for machining the workpiece. The rotational axis A of the tool spindle is indicated in FIG. 1.

It is also apparent that an optical element 30 is mounted in the area of the end-face side 20. In the illustrated case, the optical element 30 is an LED luminous element. When the end-face side 20 is viewed from the front, the optical element is situated approximately at the 1 o'clock position, and as shown in FIGS. 2 and 3, radiates light in a beam cone 32 into the area in front of the coupling section 24, i.e., the area in which the tool is situated. Machining of a workpiece typically takes place in this area. The configuration of the optical element 30 according to this embodiment is strictly by way of example. Any given number of identical or different optical elements may be provided, and mounted in different angular positions and radial levels on the end-face side 20 or in the region of a circumferential surface 31 of the spindle head 18.

The special features of the optical element 30 and its mounting in the spindle head 18 are discussed below, with reference to FIGS. 4 through 7. It is apparent in FIGS. 4 and 5 that the optical element 30 has a housing 34 that is provided with a polygonally profiled outer circumferential section 36 in its front area that protrudes from the spindle head 30 [sic; 18]. A cylindrical shaft section having a male thread formation 40 is radially inwardly offset from this outer circumferential section 36, but concentrically with respect to same. The thread 40 extends in such a way that the optical element 30 is screwable along a screw-in axis B into a recess 50 in the spindle head 18 that is provided with a corresponding female thread. This arrangement of the housing 34 results in the formation of a shoulder 42, in the vicinity of which a ring-shaped sealing arrangement 44 is situated. It is apparent from FIG. 7 that the sealing arrangement 44 is an O-ring that is accommodated in a conical undercut 46, for example. It is also apparent in FIG. 7 that the optical element is designed with a convexly curved dispersing lens 48.

On its rear side 52 the optical element has two elastically pretensioned electrical contacts 54, 56 situated at different radial levels with respect to the axis B. These electrical contacts 54, 56 are used for electrically contacting the optical element 30. A board 60 having an electrical connecting line 62 is also apparent in FIGS. 4, 6, and 7. This board 60 is firmly fixed in the spindle head 18, for example by adhesive bonding. On its end-face side 64 the board 60 has a first circular ring-shaped metallic contact surface 66 and a second circular ring-shaped metallic contact surface 68 that is concentric thereto but spaced apart from same. These two metallic contact surfaces 66, 68 are situated at different radial levels with respect to the screw-in axis B in such a way that the contact 54 comes into contact with the contact surface 66 regardless of the screw-in angle of the LED 30 at that moment, and that the contact 56 comes into contact with the contact surface 68, regardless of the screw-in angle of the LED 30 at that moment. As soon as the two contacts 54 and 56 come into contact with the respective associated contact surface 66 and 68 and the LED 30 is further screwed into the recess 50, the contacts 54 and 56 yield according to their elastic pretensioning and ensure a reliable electrical contact with the respective contact surface 66 or 68 for the electrical supply to the LED 30.

The LED 30 or any other desired optical element may be quickly and reliably inserted, contacted, or replaced using this type of arrangement. It is understood that a number of such contacts that is different from two may be used, depending on the particular optical element employed, in which case a corresponding number of contact surfaces must then be provided on the contact board 60.

According to the invention, any desired optical element may be used besides the LED described above, such as light-emitting optical elements or also other types of active receiving optical elements such as cameras, optical sensors, or the like.

Space-saving, compact, and easily serviced mounting of the particular optical element in the immediate vicinity of the machining area is possible using the arrangement according to the invention of the LED 30 or other optical elements on the end-face side 30 [sic; 20] of the spindle head. The optical elements may be used solely for illuminating the machining areas, or also for other purposes such as measurement and/or positioning of workpieces or tools, and for image monitoring of manufacturing operations.

The invention further relates to the optical element itself, in particular in its specific mounting on the end-face side of the spindle head.

The invention claimed is:

1. A spindle arrangement for a machine tool for securing a tool, comprising:
   a spindle housing in which a spindle shaft is accommodated and which is insertable and fixable in the machine tool;
   a spindle head which protrudes from the spindle housing and which has a coupling device for coupling the tool to the spindle shaft, wherein the spindle head of the machine tool comprises at least one recess;
   at least one optical element structured to at least one selected from the group of (i) emit light in a region near the spindle head and (ii) optically detect the region near the spindle head;
   wherein the spindle head defines at least one recess into which the at least one optical element is insertable and wherein in addition the at least one optical element is screwable into the at least one recess on the spindle head and fixable therein; and
   wherein the at least one optical element comprises a cylindrical shaft section, wherein the cylindrical shaft section is defined by a first end and a second end, and an axis extending therebetween, wherein the first end of the cylindrical shaft section of the at least one optical element defines a front face and the first end and the at least one recess of a spindle head of the spindle arrangement of the machine tool have (1) mating threaded formations or (2) a twist-lock mechanism so that the first end of the cylindrical shaft section of the at least one optical element is insertable and fixable into the at least one recess of the spindle head;
   a contact board fixed within the at least one recess of spindle head having contact surfaces;
   wherein the cylindrical shaft section of the optical element comprises least two contacts that are situated (i) at different radial levels on the front face first end of the cylindrical shaft section of the optical element or (ii) on the circumferential surface of the optical element spatially separate from one another, each of the at least two contacts being in direct contact and electrical communication with a corresponding contact surface of the contact board.

2. The spindle arrangement according to claim 1, wherein the contacts or the counter contacts are elastically pretensioned.

3. The spindle arrangement according to claim 1, wherein the at least one optical element comprises a light-emitting component.

4. The spindle arrangement according to claim 3, wherein the light-emitting component further comprises at least one selected from the group of an LED and a laser diode.

5. The spindle arrangement according to claim 1, wherein the at least one optical element comprises an optical sensor.

6. The spindle arrangement according to claim 5, wherein the optical sensor further comprises at least one selected from the group of a photoelectric barrier, a CCD sensor or a camera.

7. The spindle arrangement according to claim 1, wherein the at least one optical element comprises a focusing lens or a dispersing lens.

8. The spindle arrangement according to claim 1, wherein the at least one optical element is provided with a sealing arrangement that cooperates with the spindle head in a sealing manner.

9. The spindle arrangement according to claim 1, wherein the at least one optical element comprises a housing made of resistant material, the resistant material selected from the group consisting of plastic and metal.

10. The spindle arrangement according to claim 9, wherein the housing comprises a profiled outer circumference.

11. The spindle arrangement according to claim 9, wherein the housing of the optical element comprises stainless steel.

12. The spindle arrangement according to claim 9, wherein the housing of the optical element comprises plastic.

13. The spindle arrangement according to claim 1, wherein at least one optical element is provided at or in an area near the spindle head at an end face or at a circumferential surface, wherein the at least one optical element in a predetermined orientation emits light into the area where a tool is coupled to the spindle head, the light emission being directed in the shape of a cone or a beam.

14. An optical apparatus for mounting at least partially within at least one recess of a spindle head of a spindle arrangement of a machine tool, the optical apparatus comprising:

at least one optical element, the at least one optical element at least one selected from the group of (i) emitting light in a region near the spindle head and (ii) optically detecting the region near the spindle head;

wherein the at least one optical element comprises a cylindrical shaft section, wherein the cylindrical shaft section is defined by a first end and a second end, and an axis extending therebetween, wherein the first end of the cylindrical shaft section of the at least one optical element defines a front face and the first end and the at least one recess of a spindle head of the spindle arrangement of the machine tool have (1) mating threaded formations or (2) a twist-lock mechanism so that the first end of the cylindrical shaft section of the at least one optical element is insertable and fixable into the at least one recess of the spindle head;

a contact board fixed within the at least one recess of spindle head having contact surfaces; and wherein the cylindrical shaft section of the optical element comprises at least two contacts that are situated (i) at different radial levels on the front face of the cylindrical shaft section of the optical element or (ii) on the circumferential surface of the optical element spatially separate from one another, each of the at least two contacts being in direct contact and electrical communication with a corresponding contact surface of the contact board.

15. The optical apparatus of claim 14, wherein the at least one optical element is provided with a sealing arrangement that cooperates with the spindle head in a sealing manner.

16. The optical apparatus of claim 14, wherein the at least one optical element comprises a housing made of a resistant material and wherein the housing comprises a profiled outer circumference, the resistant material comprising plastic or metal.

17. The optical apparatus of claim 14, wherein the at least one optical element comprises a housing made of a resistant material, the resistant material selected from the group consisting of plastic and metal.

* * * * *